United States Patent [19]
Nagai et al.

[11] Patent Number: 6,065,789
[45] Date of Patent: May 23, 2000

[54] SUCTION APPARATUS

[75] Inventors: Shigekazu Nagai, Tokyo; Masayoshi Yamamoto, Koshigaya, both of Japan

[73] Assignee: SMC Kabushiki Kaisha, Tokyo, Japan

[21] Appl. No.: 09/172,776

[22] Filed: Oct. 15, 1998

[30] Foreign Application Priority Data

Oct. 20, 1997 [JP] Japan .................................. 9-287274

[51] Int. Cl.⁷ .................................................. B25J 15/06
[52] U.S. Cl. .......................................... 294/64.1; 294/907
[58] Field of Search ......................... 294/64.1, 65, 907; 269/21; 271/103, 108; 324/207.13, 207.2, 207.22, 207.24; 901/40, 46

[56] References Cited

U.S. PATENT DOCUMENTS

| | | | |
|---|---|---|---|
| 3,219,380 | 11/1965 | Carliss | 294/64.1 |
| 3,696,596 | 10/1972 | Wegscheid | 294/64.1 X |
| 3,923,177 | 12/1975 | Horton | 294/64.1 X |
| 4,266,905 | 5/1981 | Birk et al. | 294/907 X |
| 4,730,861 | 3/1988 | Spencer | 294/907 X |
| 5,139,245 | 8/1992 | Bruns et al. | 294/64.1 X |
| 5,183,670 | 2/1993 | Trudeau | 294/64.1 X |
| 5,201,838 | 4/1993 | Roudaut | 294/907 X |

FOREIGN PATENT DOCUMENTS 39-11426  5/1964  Japan .

Primary Examiner—Johnny D. Cherry
Attorney, Agent, or Firm—Oblon, Spivak, McClelland, Maier & Neustadt, P.C.

[57] ABSTRACT

A suction apparatus includes an opening/closing valve for supplying a negative pressure fluid to a pad section when one end of a valve rod abuts against a workpiece to make a change from a valve-closed state into a valve-opened state, and a lead switch for detecting that the opening/closing valve is changed from the valve-closed state into the valve-opened state. Once the lead switch is in the ON state, it is possible to detect that the workpiece is certainly attracted by the pad section.

9 Claims, 7 Drawing Sheets

SUCTION APPARATUS

BACKGROUND OF THE INVENTION

1. Field of the Invention

The present invention relates to a suction apparatus for attracting a workpiece in accordance with an action of a pressure fluid at a negative pressure to make it possible, for example, to transport the workpiece.

2. Description of the Related Art

A suction apparatus concerning the conventional technique (see, for example, Japanese Utility Model Publication No. 39-11426) is shown in FIG. 7. The suction apparatus 1 comprises a pad section 2 formed to have a skirt-shaped configuration, and a connector section 3 connected to the pad section 2. The pad section 2 is arranged with an opening/closing valve 6 which is continuously energized downwardly by the aid of a resilient force of a spring 5 installed in a valve chamber 4 formed in the connector section 3. A projection 7, which protrudes downwardly, is formed on the bottom surface of the opening/closing valve 6.

When an unillustrated workpiece is attracted, the opening/closing valve 6 is in a valve-open state such that the projection 7 abuts against the workpiece, and the opening/closing valve 6 is separated from a seat section 8 in opposition to the resilient force of the spring 5 in accordance with the pressing action of the workpiece. As a result, a negative pressure fluid, which has been supplied from an unillustrated negative pressure supply source to the valve chamber 4, is introduced into an internal space of the pad section 2 through a passage 9 which communicates with the valve chamber 4. Accordingly, the workpiece is attracted in accordance with the action of the negative pressure fluid.

In the conventional technique, a vacuum switch (not shown) is known, which is used to confirm whether or not the workpiece is attracted to the suction pad by utilizing a difference in pressure between a state in which the workpiece is attracted and a state in which the workpiece is not attracted. The vacuum switch is arranged with a semiconductor pressure sensor for detecting the pressure of the negative pressure fluid for attracting the workpiece. The vacuum switch changes from an OFF state into an ON state when the pressure changes from the atmospheric pressure at which the workpiece is not attracted, into a pressure which exceeds a preset pressure, in accordance with the detecting action of the semiconductor pressure sensor. Accordingly, it is possible to confirm that the workpiece is certainly attracted to the suction pad.

However, the following inconvenience arises when it is intended to confirm whether or not the workpiece is attracted according to the ON/OFF state of the vacuum switch by detecting the pressure fluid in the valve chamber 4 by using the semiconductor pressure sensor, wherein the vacuum switch is connected to the valve chamber 4 of the suction apparatus 1 concerning the conventional technique by the aid of an unillustrated tube or the like. That is, when the workpiece is not attracted, then the workpiece does not abut against the projection 7 of the opening/closing valve 6, and the opening/closing valve 6 is in a valve-closed state. Therefore, the negative pressure of the valve chamber 4 may exceed the preset pressure for the vacuum switch, and the vacuum switch may be in the ON state.

In other words, in the case of the suction apparatus 1 concerning the conventional technique, the pressure fluid, which is supplied from the negative pressure supply source, is directly introduced into the valve chamber 4, giving a state in which the negative pressure in the valve chamber 4 exceeds the preset pressure for the vacuum switch regardless of the valve-open state or the valve-closed state of the opening/closing valve 6. For this reason, the vacuum switch is always in the ON state irrelevant to the presence or absence of the attraction of the workpiece. Therefore, an inconvenience arises in that it is impossible to confirm whether or not the workpiece is certainly attracted, even when the suction apparatus 1 concerning the conventional technique is provided with the vacuum switch.

SUMMARY OF THE INVENTION

A general object of the present invention is to provide a suction apparatus provided with an opening/closing valve, which makes it possible to reliably confirm the present or absence of attraction of a workpiece.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
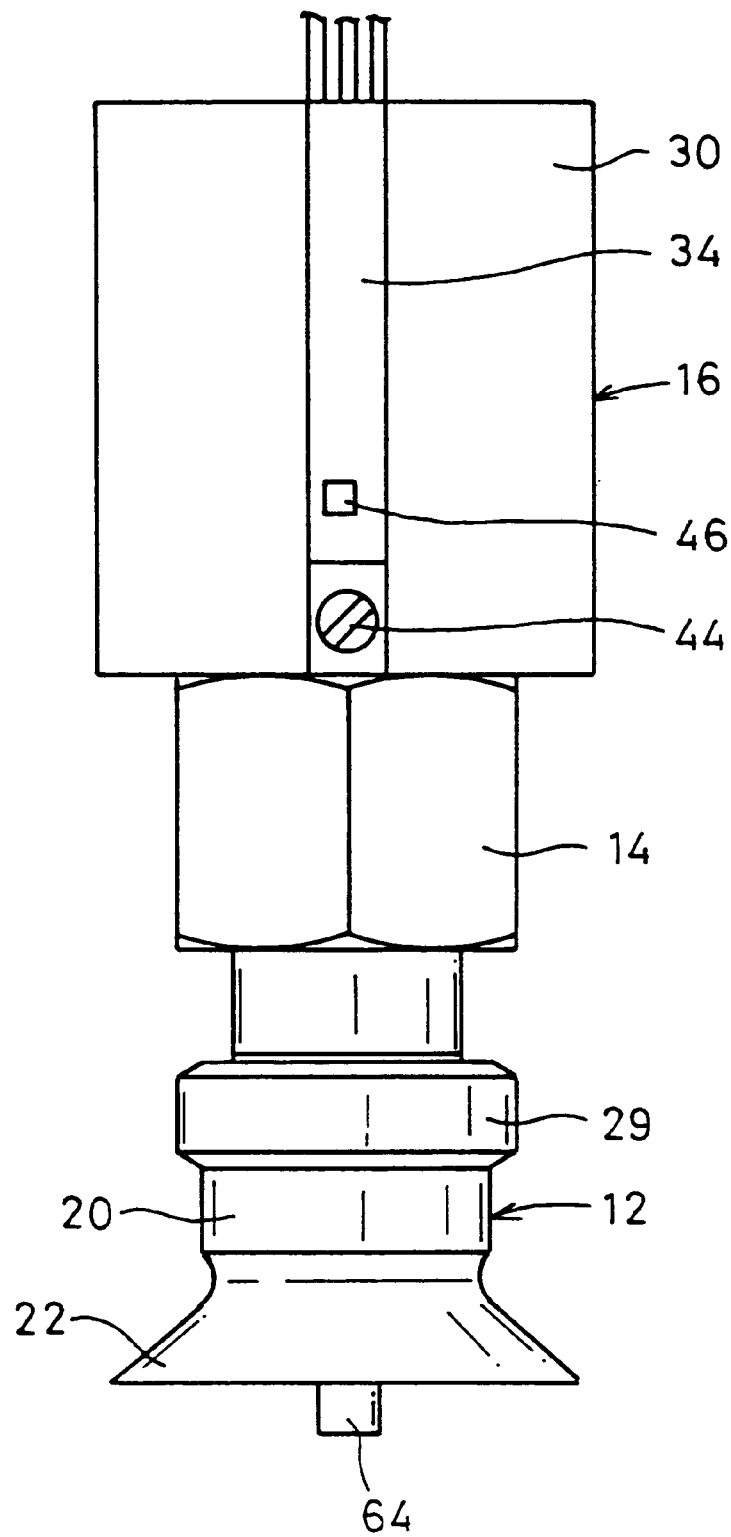
FIG. 1 shows a front view illustrating a suction apparatus according to an embodiment of the present invention.

With reference to FIG. 1, reference numeral 10 denotes a suction apparatus according to an embodiment of the present invention.

The suction apparatus 10 comprises a pad section 12 for making contact with a workpiece W (see FIGS. 3 and 4) to attract the workpiece W in accordance with an action of a pressure fluid at a negative pressure, a detecting section 16 disposed with a connector 14 connected to the pad section 12, for detecting whether or not the workpiece W is certainly attracted, and an opening/closing valve 18 (see FIGS. 3 and 4) with its one end for making abutment against the workpiece W to cause upward displacement so that the change is made from a valve-closed state into a valve-open state.

Figure 3:
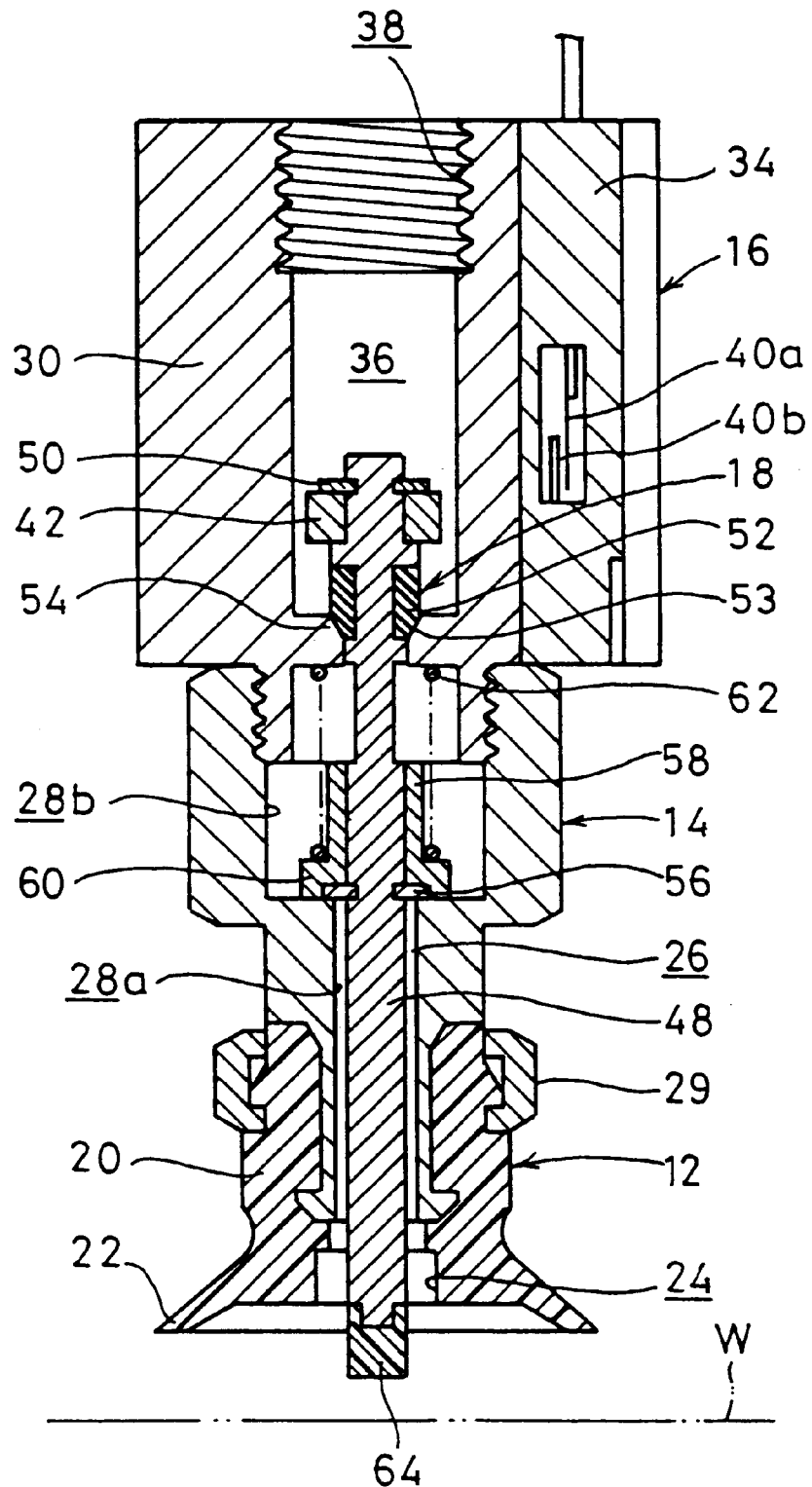
FIG. 3 shows a longitudinal sectional view taken along line III—III shown in FIG. 2.
Figure 4:
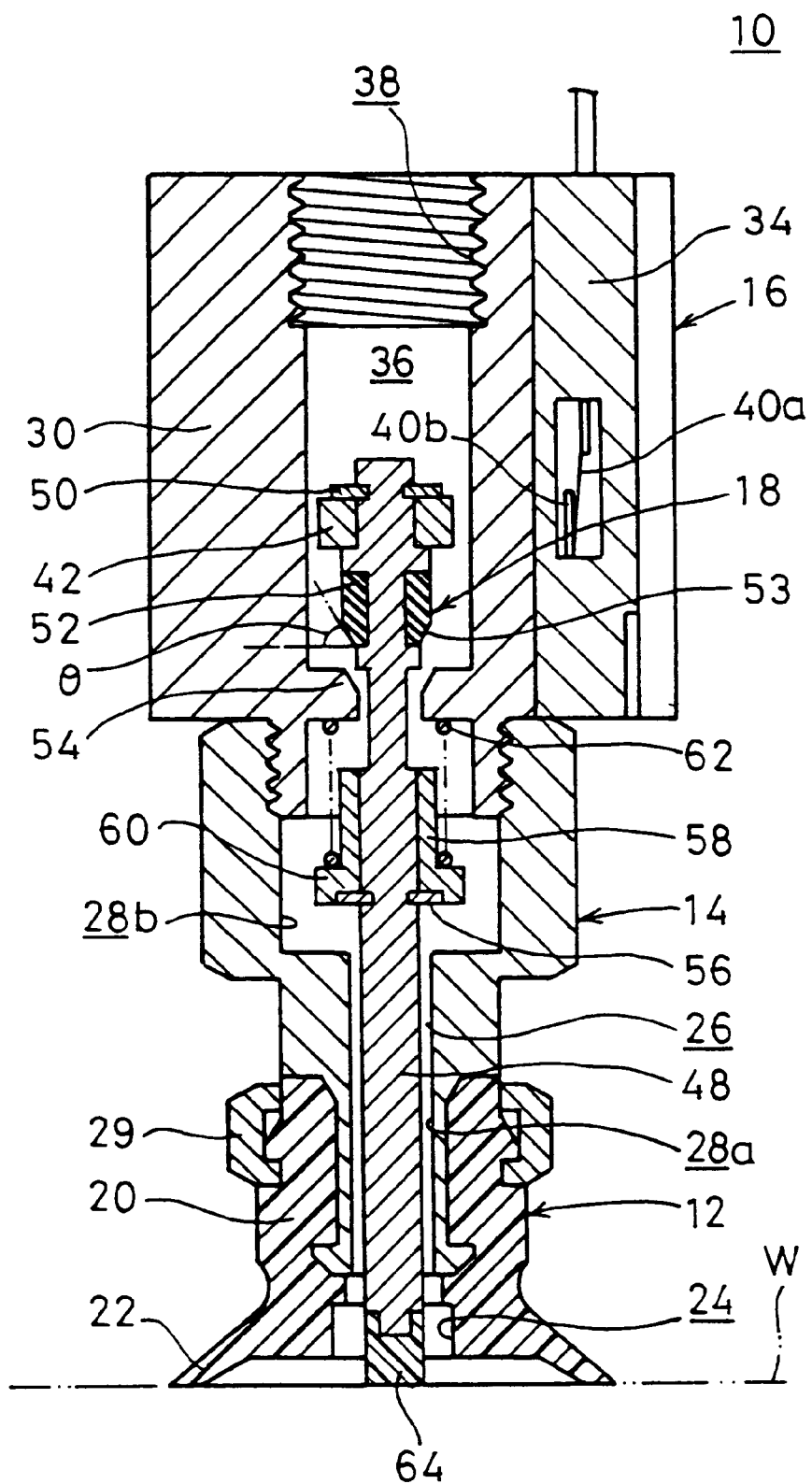
FIG. 4 shows a longitudinal sectional view illustrating a state obtained by making change from a valve-closed state of an opening/closing valve shown in FIG. 3 into a valve-open state.

As shown in FIGS. 3 and 4, the pad section 12 comprises a proximal section 20 which is formed to have a thick-walled cylindrical configuration, and a skirt section 22 which is formed integrally with the proximal section 20 with its gradually increasing diameter. The pad section 12 is formed of, for example, a material such as H-NBR. The proximal section 20 is formed with a first through-hole 24 which has an annular step section and which extends up to the skirt section 22.

The connector 14, which is formed with a second through-hole 26 communicating with the first through-hole 24, is coupled to an upper portion of the pad section 12. The detecting section 16 is provided on an upper portion of the connector 14. The second through-hole 26 is composed of a small diameter hole 28a disposed on the side of the pad section 12, and a large diameter hole 28b disposed on the side of the detecting section 16. Reference numeral 29 denotes a lock ring for fixing the pad section 12 to the connector 14.

Figure 2:
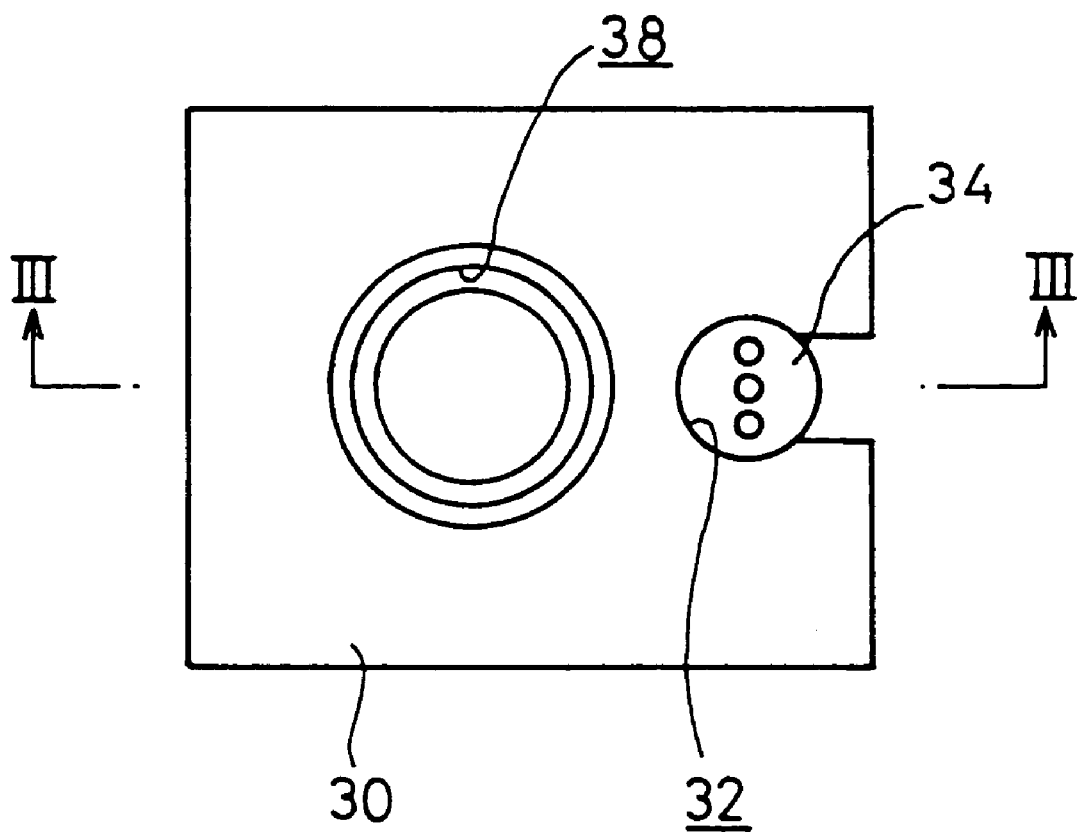
FIG. 2 shows a plan view illustrating the suction apparatus shown in FIG. 1.

As shown in FIGS. 3 and 4, the detecting section 16 comprises a rectangular parallelepiped-shaped support member 30 which is fitted to the connector 14 by the aid of a screw section, and a lead switch 34 which is detachably installed to a long groove 32 (see FIG. 2) having an elliptic cross section formed on one side surface of the support member 30 along the axial direction. A valve chamber 36, which communicates with the second through-hole 26, is formed in the support member 30. A negative pressure supply port 38, which communicates with the valve chamber 36, is formed at an upper surface of the support member 30. The negative pressure supply port 38 is connected with, for example, a tube which communicates with a negative pressure supply source via an unillustrated joint means such as a tube joint.

The lead switch 34 is arranged with a pair of lead strips 40a, 40b which are disposed in an unillustrated glass tube and which are separated from each other by a predetermined spacing distance. The pair of lead strips 40a, 40b contact with each other at their ends in accordance with an action of a magnetic field of a magnet 42 as described later on. Accordingly, the lead switch 34 is in the ON state.

In FIG. 1, reference numeral 44 denotes a set screw for fastening the lead switch 34 into the long groove 32. Reference numeral 46 denotes a window for visually recognizing emitted light from LED, wherein the light is emitted from unillustrated LED when the lead switch 34 is in the ON state.

As shown in FIGS. 3 and 4, the opening/closing valve 18 is provided in the valve chamber 36 and in the first and second through-holes 24, 26 for communicating the pad section 12, the connector 14, and the detecting section 16 respectively. The opening/closing valve 18 has a valve rod 48 which is displaceable substantially vertically through the first and second through-holes 24, 26 and the valve chamber 36.

The ring-shaped magnet 42, which is fastened to an annular groove by the aid of a retaining ring 50, is disposed at an upper portion of the valve rod 48. A valve plug 52, which is formed of, for example, an elastic member made of a material such as rubber, is installed to a portion adjacent to the magnet 42. A tapered section 53, which has its diameter gradually decreasing downwardly, is formed at the lower end of the outer circumference of the valve plug 52. The valve plug 52 is seated on a seat section 54 which is formed on the support member 30 corresponding to the shape of the tapered section 53. Thus, the opening/closing valve 18 is in the valve-closed state. The angle of inclination θ of the tapered section 53 (see FIG. 4) is set to be about 60 degrees. Accordingly, any unbalanced load in the lateral direction, which may be applied to the valve rod 48, can be appropriately absorbed.

A fastening member 58 is installed to an intermediate portion of the valve rod 48 by the aid of a ring member 56. A spring member 62 is interposed between the support member 30 and an annular projection 60 formed on the fastening member 58. The valve rod 48 is in a state of being always energized downwardly in accordance with an action of the resilient force of the spring member 62. The annular projection 60 abuts against the step section of the connector 14, and thus it functions as a stopper for regulating the downward displacement of the valve rod 48.

An elastic member 64, which protects the workpiece W when the valve rod 48 abuts against the workpiece W, is connected to the lower end of the valve rod 48. The elastic member 64 is designed to be in a state in which it protrudes externally by a predetermined length from the lower end surface of the skirt section 22 when the workpiece W is not attracted (see FIG. 3).

The suction apparatus 10 according to the embodiment of the present invention is basically formed as described above. Next, its operation, function, and effect will be explained.

At first, an unillustrated fixing means is used to connect the suction apparatus 10, for example, to an arm of a robot. The suction apparatus 10 is set to be displaceable in accordance with the operation of the arm. The unillustrated tube joint is connected to the negative pressure supply port 38 of the support member 30. The tube, which communicates with the unillustrated negative pressure supply source, is connected beforehand to the tube joint. The negative pressure fluid having a predetermined pressure is previously supplied into the valve chamber 36 via the negative pressure supply port 38 in accordance with the action of the energized negative pressure supply source.

In this situation, as shown in FIG. 3, the valve plug 52 is seated on the seat section 54 in accordance with the action of the resilient force of the spring member 62, and the opening/closing valve 18 is in the valve-closed state. Accordingly, the negative pressure fluid supplied to the valve chamber 36 stays in the valve chamber 36, and is prevented from outflow toward the pad section 12. In the ordinary state shown in FIG. 3, the lead switch 34 does not undergo the action of the magnetic field exerted by the magnet 42, and hence it is in the OFF state.

After completion of the preparatory operation as described above, the unillustrated robot is energized to operate the arm so that the pad section 12 abuts against the workpiece W. In this embodiment, as shown in FIG. 4, the elastic member 64 abuts against the workpiece W, and the valve rod 48 is pressed upwardly. Accordingly, the valve rod 48 is displaced upwardly integrally with the valve plug 52. Therefore, the valve plug 52 is separated from the seat section 54, and thus the opening/closing valve 18 is in the valve-open state. The negative pressure fluid, which has been supplied to the valve chamber 36, is introduced into the space in the pad section 12 via the first and second through-holes 24, 26 communicating with each other.

The skirt section 22 of the pad section 12 contacts with the workpiece W, and thus the closed space is formed in the skirt section 22. The workpiece W is attracted in accordance with the action of the negative pressure fluid introduced into the space. In this situation, the magnet 42 is displaced upwardly integrally with the valve rod 48. The pair of lead strips 40a, 40b, which constitute the lead switch 34, make contact with each other in accordance with the action of the magnetic field of the magnet 42, thus giving the ON state.

Therefore, once the lead switch 34 is in the ON state, it is possible to detect that the workpiece W is certainly attracted by the pad section 12. A detection signal outputted from the lead switch 34 is fed via a lead wire to an unillustrated controller. Thus, desired control is performed.

Unillustrated LED causes light emission when the lead switch 34 is in the ON state. Accordingly, the operator can successfully confirm that the workpiece W is certainly attracted by the pad section 12 by visually recognizing the emitted light of LED through the window 46 with ease.

Figure 5:
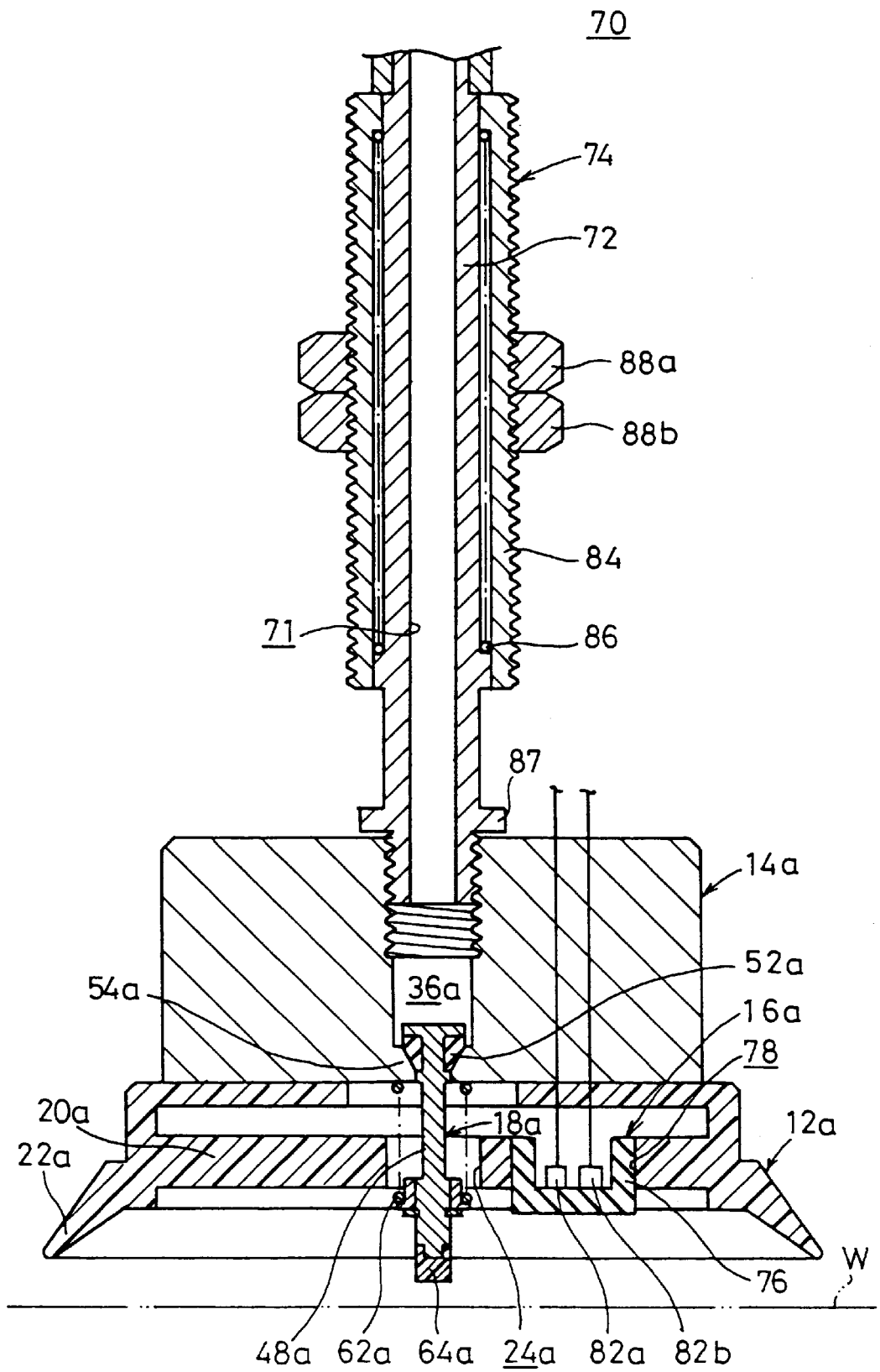
FIG. 5 shows a longitudinal sectional view illustrating a suction apparatus according to another embodiment of the present invention.
Figure 6:
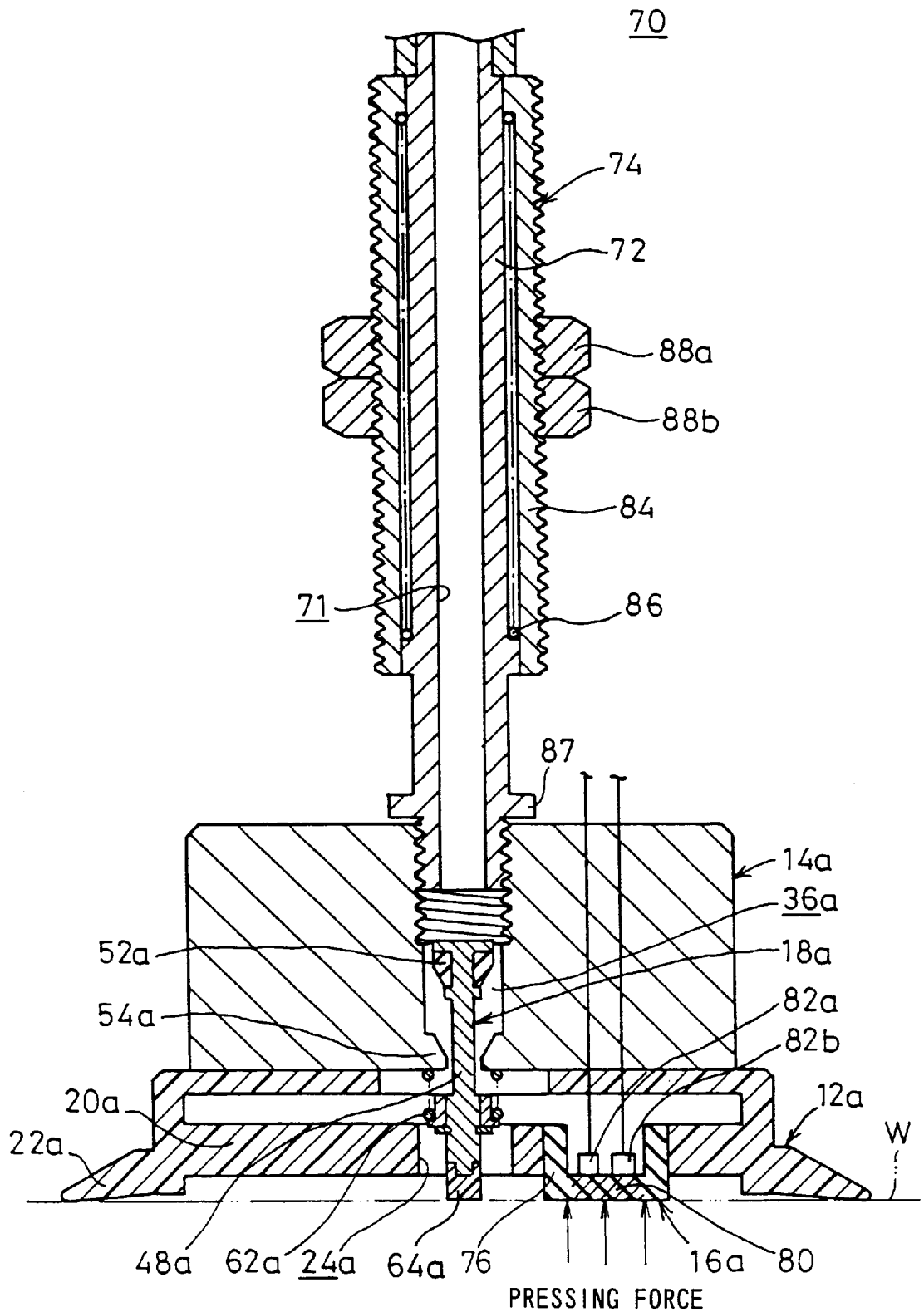
FIG. 6 shows a longitudinal sectional view illustrating a state obtained by making change from a valve-closed state of an opening/closing valve shown in FIG. 5 into a valve-open state.
Figure 7:
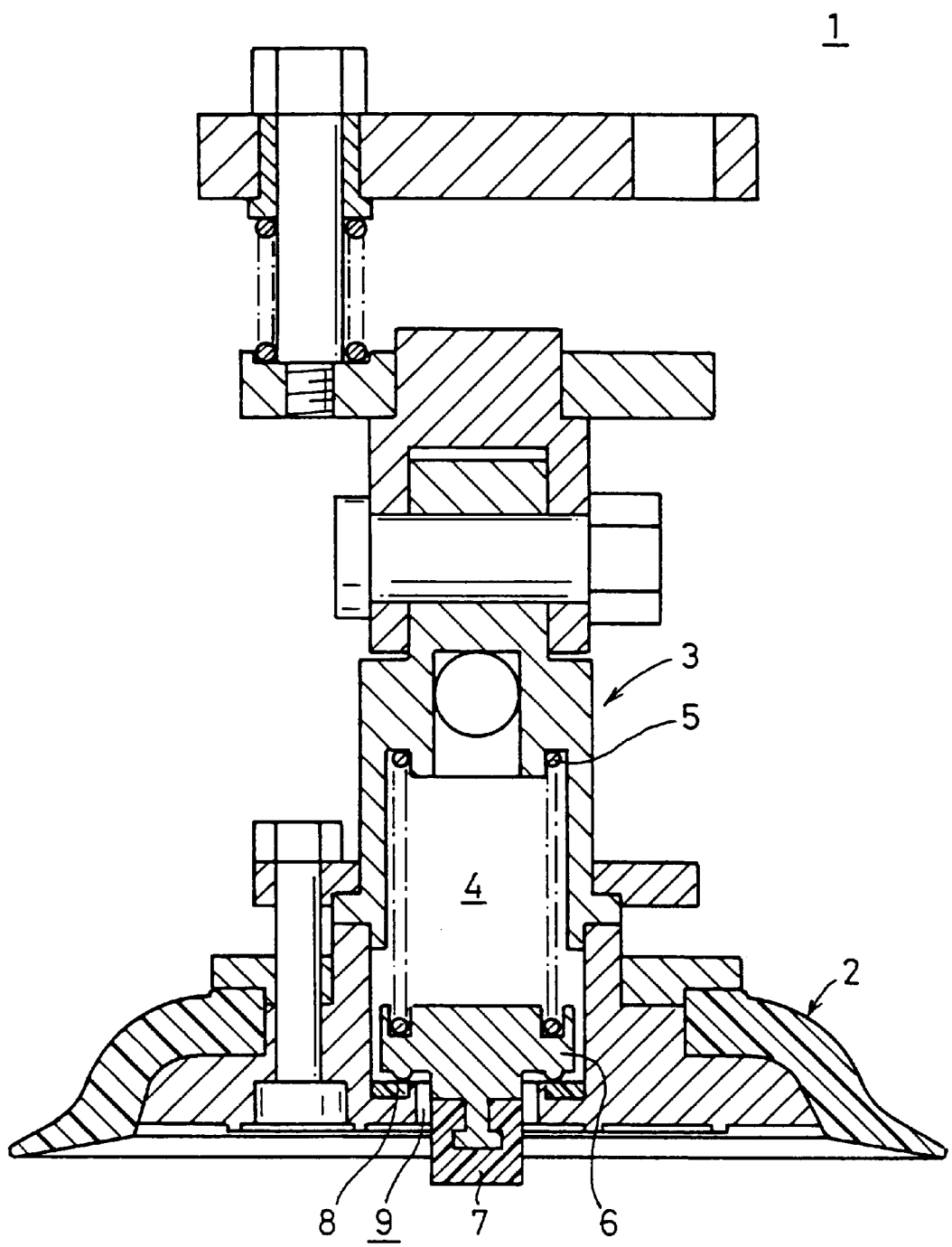
FIG. 7 shows a longitudinal sectional view illustrating a suction apparatus concerning the conventional technique.

Next, a suction apparatus 70 according to another embodiment of the present invention is shown in FIGS. 5 and 6. Constitutive components or parts corresponding to those of the suction apparatus 10 according to the foregoing embodiment are designated by the same reference numerals but affixed with a symbol "a" to make explanation below.

The suction apparatus 70 comprises a pad section 12a composed of a proximal section 20a and a skirt section 22a, a connector 14a connected to an upper portion of the pad section 12a, and a buffering mechanism 74 connected to the connector 14a and provided with a rod member 72 formed with a passage 71 which communicates with a valve chamber 36a.

The suction apparatus 70 according to this embodiment is different from the suction apparatus 10 according to the foregoing embodiment in that a pressure-sensitive conductive rubber 76 is used in place of the lead switch 34.

The pressure-sensitive conductive rubber 76 is arranged to slightly protrude from a hole 78 of the proximal section 20a so that its bottom surface abuts against the workpiece W when the workpiece W is attracted. The pressure-sensitive conductive rubber 76 is formed of, for example, a composite material comprising silicon rubber and metal fine particles. The pressure-sensitive conductive rubber 76 is ordinarily in the insulated state when no pressing force is applied. However, when the pressing force is applied by the workpiece W in abutment, then the pressure-sensitive conductive rubber 76 undergoes a change in its resistance, and it is in the conducting state.

Therefore, as shown in FIG. 6, the conducting state is given as a result of decrease in resistance of a portion 80 to which the pressing force is applied by the workpiece W. Accordingly, a current flows between a pair of electrodes 82a, 82b, and the ON state is given. Thus, it is possible to detect that the workpiece W is certainly attracted by the pad section 12a. A detection signal outputted from the pressure-sensitive conductive rubber 76 is fed via a lead wire to an unillustrated controller.

The buffering mechanism 74 comprises a cylindrical member 84 threaded with a screw groove on its outer circumferential surface, and a spring member 86 installed between the cylindrical member 84 and the rod member 72. In this embodiment, as shown in FIG. 6, when the pad section 12a abuts against the workpiece W, the cylindrical member 84 and the rod member 72 are relatively displaced to compress the spring member 86 so that the shock is absorbed. Thus, the workpiece W can be smoothly attracted. An annular projection 87 is formed on the lower side of the rod member 72. When the lower end of the cylindrical member 84 makes abutment, the annular projection 87 functions as a stopper regulate its displacement. Reference numerals 88a, 88b denote a pair of ring members for fixing the suction apparatus 70 to an arm of a robot or the like and making adjustment in the height direction. The other function and effect are equivalent to those obtained in the foregoing embodiment, detailed explanation of which will be omitted.

In the embodiments described above, explanation has been made by using, as the detecting means, the lead switch 34 and the pressure-sensitive conductive rubber 76. However, there is no limitation thereto. It is also allowable to use other mechanical switches, magnetic switches, or electric switches.

What is claimed is:

1. A suction apparatus comprising:

a pad section for attracting a workpiece as a result of a negative pressure of a fluid applied to said pad section;

an opening/closing valve with a valve rod provided in a fluid passage for supplying the fluid having a negative pressure to the pad section, wherein a valve plug formed at the valve rod is separated from or seated on a seat section so as to open/close the fluid passage; and a detecting section comprising a detecting element for detecting a change in one of a magnetic field and an electric current provided integrally with the pad section, for detecting, as a result of said change in the magnetic field or said electric current, that the opening/closing valve is changed from a valve-closed state to a valve-opened state by displacement of the valve rod when a projection formed at one end of the valve rod abuts against the workpiece.

2. A suction apparatus according to claim 1, wherein said opening/closing valve supplies said fluid having a negative pressure to said pad section when said projection abuts against said workpiece, and when the valve rod is displaced to cause a change from a valve-closed state to a valve opened state, and wherein said detecting section comprises a detecting mechanism having a magnetic field detecting element for detecting said change from said valve-closed state to said valve-opened state as a result of a change in a magnetic field generated by movement of a magnet installed on said valve rod of said opening/closing valve.

3. The suction apparatus according to claim 2, wherein said detecting mechanism comprises at least a lead switch.

4. The suction apparatus according to claim 2, wherein said valve plug for closing a valve chamber by being seated on a seat section is installed on said valve rod of said opening/closing valve, and a tapered section for absorbing any unbalanced load in a lateral direction is formed on said valve plug.

5. A suction apparatus according to claim 1, wherein:

said opening/closing valve supplies said negative pressure fluid to said pad section when a projection abuts against said workpiece and when the valve rod is displaced to cause change from a valve-closed state into a valve-opened state; and wherein:

said detecting section has a detecting mechanism for detecting that said opening/closing valve is changed from said valve-closed state into said valve-opened state by making abutment against said workpiece to generate an electric change of state by a pressing force of said workpiece.

6. The suction apparatus according to claim 5, wherein said detecting mechanism comprises at least a pressure-sensitive conductive rubber for making the electric change from an insulated state into a conducting state as a result of a decrease in resistance caused when said pressing force of said workpiece is applied.

7. The suction apparatus according to claim 6, wherein said pressure-sensitive conductive rubber is provided with a pair of electrodes which are separated from each other by a predetermined spacing distance, for detecting a detection signal obtained when said pressure-sensitive conductive rubber is in said conducting state.

8. The suction apparatus according to claim 5, further comprising a buffering mechanism connected via a connector to said pad section, wherein said buffering mechanism comprises a rod member connected to said connector, a cylindrical member for surrounding an outer circumferential surface of said rod member, and a spring member interposed between said rod member and said cylindrical member, and wherein said rod member and said cylindrical member are relatively displaced in opposition to a resilient force of said spring member so that any shock is absorbed when said workpiece is attracted.

9. The suction apparatus according to claim 8, wherein said rod member is provided with a pair of ring members fitted to a screw groove formed on an outer circumferential surface, for making adjustment for said pad section in a height direction.

\* \* \* \* \*